(12) United States Patent
Pehlke

(10) Patent No.: US 9,397,721 B2
(45) Date of Patent: Jul. 19, 2016

(54) SYSTEMS AND METHODS FOR REDUCING FILTER INSERTION LOSS WHILE MAINTAINING OUT-OF BAND ATTENUATION

(71) Applicant: Skyworks Solutions, Inc., Woburn, MA (US)

(72) Inventor: David Richard Pehlke, Westlake Village, CA (US)

(73) Assignee: SKYWORKS SOLUTIONS, INC., Woburn, MA (US)

(*) Notice: Subject to any disclaimer, the term of this patent is extended or adjusted under 35 U.S.C. 154(b) by 336 days.

(21) Appl. No.: 13/862,237

(22) Filed: Apr. 12, 2013

(65) Prior Publication Data

US 2013/0273860 A1 Oct. 17, 2013

Related U.S. Application Data

(60) Provisional application No. 61/623,509, filed on Apr. 12, 2012.

(51) Int. Cl.
*H04B 1/44* (2006.01)
*H04B 1/525* (2015.01)

(52) U.S. Cl.
CPC . *H04B 1/44* (2013.01); *H04B 1/525* (2013.01)

(58) Field of Classification Search
None
See application file for complete search history.

(56) References Cited

U.S. PATENT DOCUMENTS

| | | | |
|---|---|---|---|
| 6,075,500 A * | 6/2000 | Kurz et al. | ............ 343/895 |
| 7,057,472 B2 | 6/2006 | Fukamachi et al. | |
| 7,656,251 B1 | 2/2010 | Bauder et al. | |
| 2003/0104796 A1 | 6/2003 | Yoon | |
| 2004/0018819 A1 | 1/2004 | Coan | |
| 2005/0094744 A1 * | 5/2005 | Ramachandran et al. | .... 375/316 |
| 2007/0066245 A1 | 3/2007 | Snider | |
| 2008/0212552 A1 | 9/2008 | Fukamachi et al. | |
| 2009/0124213 A1 | 5/2009 | Rubin et al. | |

(Continued)

FOREIGN PATENT DOCUMENTS

| | | |
|---|---|---|
| JP | 2004-343696 A | 12/2004 |
| JP | 2008-005182 A | 1/2008 |
| WO | WO 2011/146404 A1 | 11/2011 |

OTHER PUBLICATIONS

International Search report and Written Opinion dated Sep. 27, 2013 for Application No. PCT/US2013/036496 filed Apr. 12, 2013, 12 pages.

(Continued)

*Primary Examiner* — Alejandro Rivero
(74) *Attorney, Agent, or Firm* — Knobbe Martens Olson & Bear LLP

(57) ABSTRACT

Disclosed are systems and methods for reducing filter insertion loss while maintaining out-of-band attenuation. In some embodiments, a system can be configured for processing of radio-frequency (RF) signals. The system can include a plurality of signal paths configured to accommodate multiple frequency bands, with each of the multiple bands having a passband. The system can further include a filter circuit disposed along each of the signal paths. At least one of the filter circuits can be segmented into two or more segments that substantially cover the passband corresponding to the filter circuit. The segmented filter circuit can be configured to provide a desired attenuation of out-of-band interferers and a desired insertion loss level. In some embodiments, the signal paths can include receive (Rx) paths.

19 Claims, 15 Drawing Sheets

(56) References Cited

U.S. PATENT DOCUMENTS

| | | |
|---|---|---|
| 2010/0029332 A1 | 2/2010 | Fox |
| 2011/0043285 A1 | 2/2011 | Zhao et al. |
| 2011/0175789 A1 | 7/2011 | Lee et al. |
| 2011/0187478 A1 | 8/2011 | Link et al. |
| 2012/0202561 A1 | 8/2012 | Robinett |
| 2012/0243446 A1* | 9/2012 | Mueller et al. ............... 370/280 |
| 2012/0257523 A1 | 10/2012 | Kasturi et al. |
| 2013/0137475 A1* | 5/2013 | Rousu ............... H04W 72/0453 455/509 |
| 2013/0265912 A1* | 10/2013 | Ikonen et al. ................. 370/278 |
| 2013/0273859 A1 | 10/2013 | King et al. |

OTHER PUBLICATIONS

International Search Report and Written Opinion for Application No. PCT/US2013/036495, dated Sep. 16, 2013.

* cited by examiner

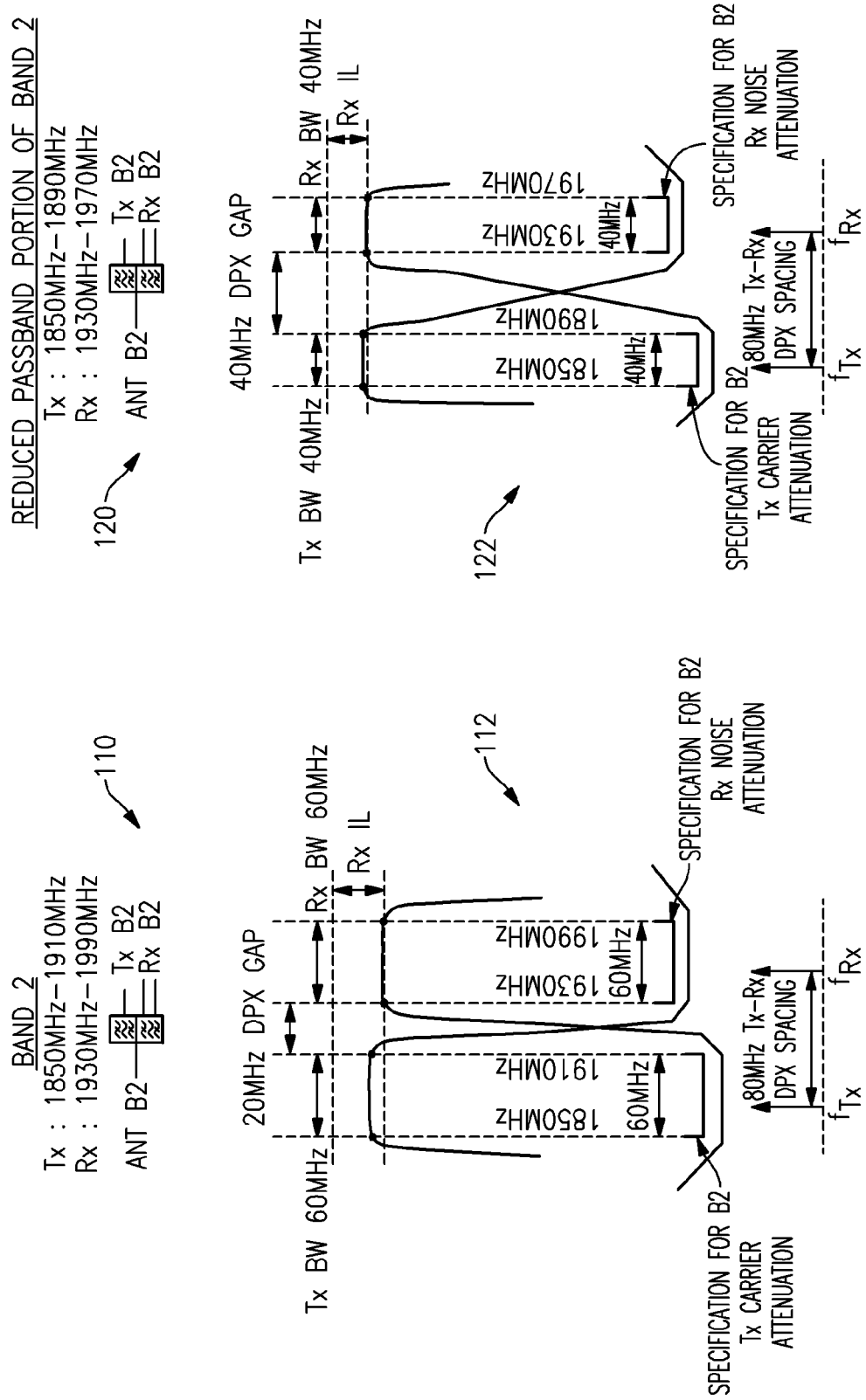

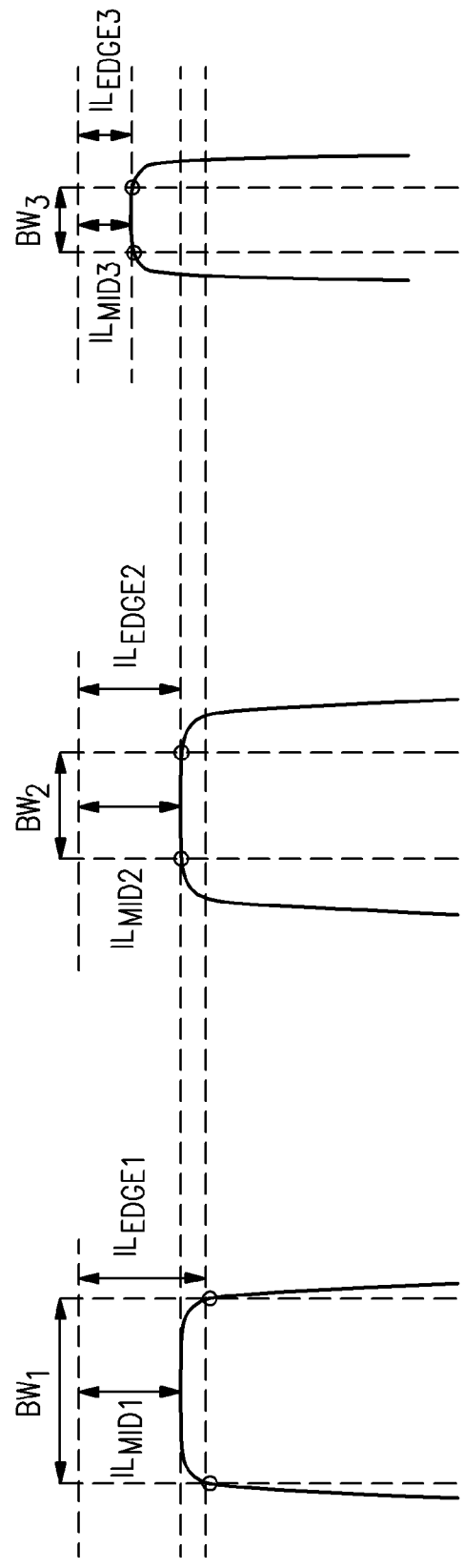

SYSTEMS AND METHODS FOR REDUCING FILTER INSERTION LOSS WHILE MAINTAINING OUT-OF BAND ATTENUATION

CROSS-REFERENCE TO RELATED APPLICATIONS

This application claims priority to U.S. Provisional Application No. 61/623,509 filed Apr. 12, 2012 and entitled "SYSTEMS AND METHODS FOR REDUCING FILTER INSERTION LOSS WHILE MAINTAINING OUT-OF-BAND ATTENUATION," which is expressly incorporated by reference herein in its entirety.

BACKGROUND

1. Field

The present disclosure generally relates to systems and method for reducing filter insertion loss while maintaining out-of-band attenuation in radio-frequency (RF) applications.

2. Description of the Related Art

A radio-frequency (RF) device such as a wireless device often includes a transmitter and a receiver for generating a Tx signal and process an Rx signal, respectively. Processing of such signals can involve filtering operations. In many situations, it is desirable to utilize filtering configurations that provide relatively low insertion loss, as well as relatively large out-of-band attenuation.

SUMMARY

In some implementations, the present disclosure relates to a system for processing radio-frequency (RF) signals. The system includes a plurality of signal paths configured to accommodate multiple frequency bands, with each of the multiple bands having a passband. The system further includes a filter circuit disposed along each of the signal paths. At least one of the filter circuits is segmented into two or more segments that substantially cover the passband corresponding to the filter circuit. The at least one segmented filter circuit is configured to provide a desired attenuation of out-of-band interferers and a desired insertion loss level.

In some embodiments, the signal paths can include receive (Rx) paths. The Rx paths can include Rx-only paths. The at least one segmented filter circuit can include a first segmented filter circuit and a second segmented filter circuit arranged in a receive-only duplexer configuration to provide improved out-of-band attenuation. The first and second segmented filter circuits can be configured to provide frequency coverage for substantially the entire corresponding passband. The first and second segmented filter circuits can be further configured so that a maximum channel bandwidth associated with the passband is within the separate passbands associated with the first and second segmented filter circuits.

In some embodiments, the receive-only duplexer configuration can include a diversity receive circuit of a front end system. The diversity receive circuit can be configured to operate with a strong transmit (Tx) carrier suppression property.

In some embodiments, the segments of the at least one segmented filter circuit can share a common Rx port and a duplex shared port. In some embodiments, the system can further include a switch configured to allow selection of a band. In some embodiments, the system can further include a duplexer configured to duplex outputs of the first and second segmented filter circuits and provide further frequency dependent selective combining to yield a common output. In some embodiments, the receive-only duplexer configuration can include a duplex function that is substantially symmetric with respect to placement of a half-wave element at a shared antenna port, or placed entirely on one or the other Rx side.

In some embodiments, the multiple frequency bands can include bands B1, B2, B3 and B4 associated with a 3GPP communication standard. Transmit and receive passbands associated with the bands B1, B3 and B4 can be consolidated with four passbands. The bands B3 and B4 can be partitioned in a selected manner to yield a Tx-Rx duplexing configuration having a decreased passband bandwidth and an increased duplex gap to yield a decreased insertion loss and an improved out-of-band attenuation. The bands B1, B2, B3 and B4 can be partitioned such that the Rx bands are broken up and covered in pieces. The pieces of frequency segments can be consolidated based on overlap bands and possible location of simultaneous Tx carrier frequencies to improve isolation from Tx carrier desense nonlinear effects.

In some embodiments, the signal paths can include at least one transmit (Tx) path.

According to a number of implementations, the present disclosure relates to a front-end architecture for a radio-frequency (RF) device. The architecture includes a transmit (Tx) path configured to operate at a selected one of a plurality of Tx bands and transmit at the selected band through a first antenna. The architecture further includes a receive (Rx) path configured to operate at a selected one of a plurality of Rx bands with signals received through the first antenna. The architecture further includes a diversity Rx path connected to a second antenna and having at least some of the Rx bands duplexed. The architecture further includes a bypass circuit configured to allow operation of the Tx path with the Rx path or the diversity Rx path, with the latter providing a higher level of out-of-band attenuation of Tx carriers.

In some embodiments, the Tx path can include at least some duplexing of the Tx bands to facilitate the Tx operation with the diversity path.

In accordance with some implementations, the present disclosure relates to a radio-frequency (RF) module that includes a packaging substrate configured to receive a plurality of components. The RF module further includes a filter system disposed on the packaging substrate and having a plurality of filter circuits configured to accommodate multiple frequency bands. At least one of the filter circuits is segmented into two or more segments that substantially cover a passband associated with the segmented filter circuit to provide a desired attenuation of out-of-band interferers and a desired insertion loss level. The RF module further includes a plurality of connectors configured to provide electrical connections between the filter system and the packaging substrate.

As taught in a number of implementations, the present disclosure relates to a radio-frequency (RF) device that includes a transceiver configured to process RF signals in multiple frequency bands. The RF device further includes one or more antennas in communication with the transceiver to facilitate transmission and reception of the RF signals. The RF device further includes a filter system connectable to the transceiver and the one or more antennas. The filter system includes a plurality of filter circuits configured to accommodate the multiple frequency bands. At least one of the filter circuits is segmented into two or more segments that substantially cover a passband associated with the segmented filter circuit to provide a desired attenuation of out-of-band interferers and a desired insertion loss level.

In some embodiments, the RF device can include a wireless device. In some embodiments, the multiple frequency bands can include quad-bands of a 3GPP standard.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 5A shows an example of frequency spacing between Tx and Rx portions of an example band.

FIG. 5B shows an example of a reduced passbands corresponding to the Tx and Rx portions of FIG. 5A.

FIG. 6A shows an example SAW (surface acoustic wave) filter insertion loss profile.

FIG. 6B shows an improved insertion loss for the SAW filter of FIG. 6A with a reduced bandwidth.

FIG. 6C shows a further improved insertion loss for a SAW filter optimized for smaller bandwidth.

DETAILED DESCRIPTION OF SOME EMBODIMENTS

The headings provided herein, if any, are for convenience only and do not necessarily affect the scope or meaning of the claimed invention.

Figure 1:
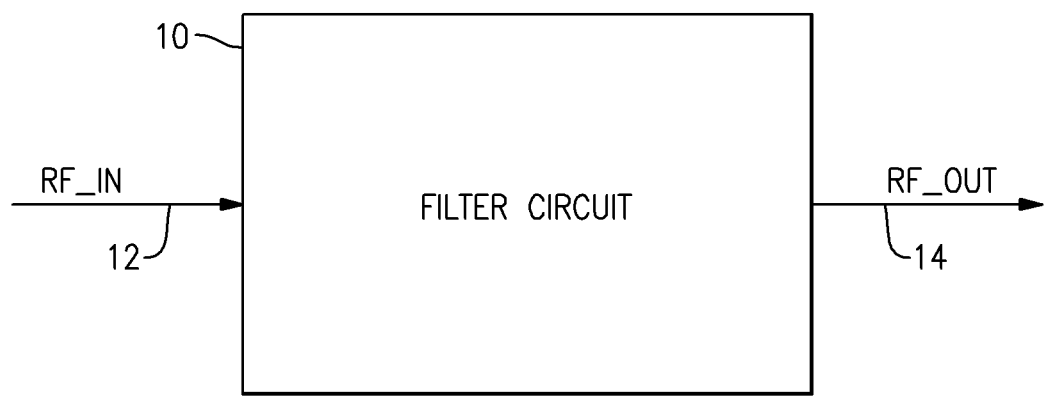
FIG. 1 schematically depicts a filter circuit for radio-frequency (RF) applications.

Disclosed herein are systems and methods related to improved filtering of radio-frequency (RF) signals. FIG. 1 shows a filter circuit 10 configured to receive an input RF signal 12 (RF_in) and yield an output RF signal 14 (RF_out). In some implementations, such a filtered RF signal can include receive (Rx) signals, and examples are described in such a context. It will be understood, however, that one or more features of the present disclosure can also be implemented for filtering other types of RF signals.

Figure 2:
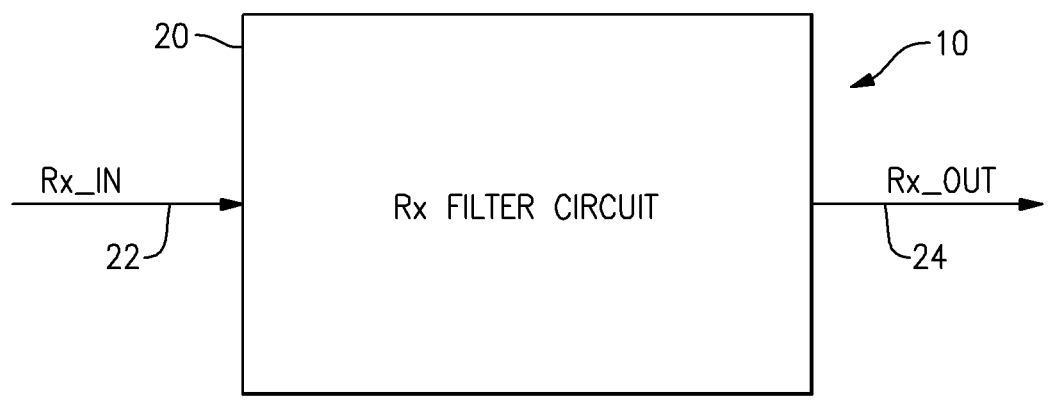
FIG. 2 schematically depicts a receive (Rx) filter circuit that can be an example of the filter circuit if FIG. 1.

FIG. 2 shows that in some embodiments, the filter circuit 10 of FIG. 1 can be implemented in as an Rx-signal filter circuit 20. Such a configuration is shown to accommodate passage of a selected portion of a receive signal 22 (Rx_in) as a filtered output signal 24 (Rx_out). Various non-limiting examples of the filtering configuration 20 described herein can provide improved filtering performance.

In some implementations, methods and apparatus disclosed herein can be utilized for optimization of radio communication links, including those that utilize filtering with both relatively low insertion loss as well as relatively large out-of-band attenuation for known offset interferers. Frequency Division Duplex (FDD) in Wideband Code Division Multiple Access (WCDMA) as shown in FIG. 3 is an example configuration where such filtering can be implemented.

Figure 3:
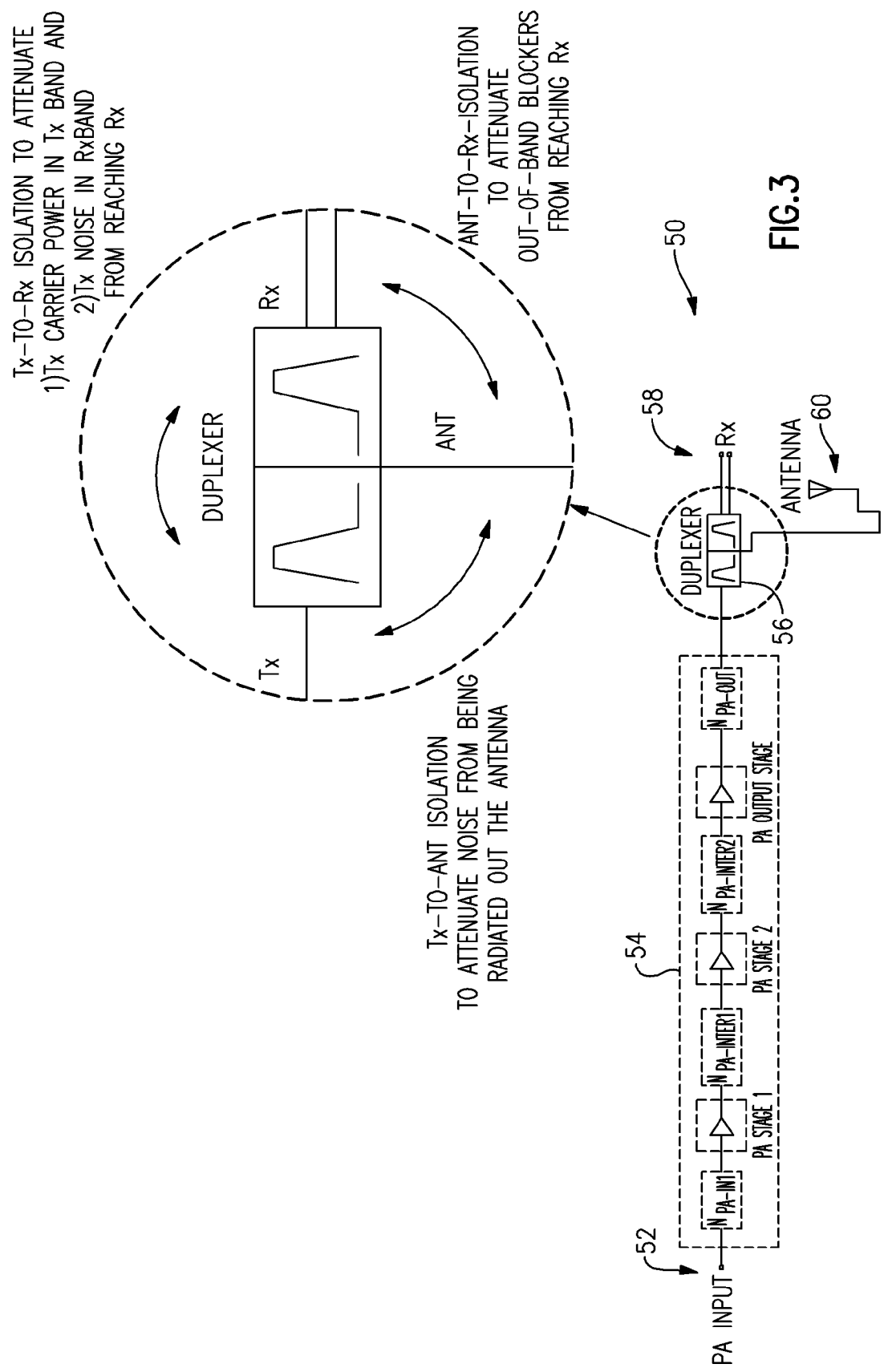
FIG. 3 shows an example duplexer configured to provide Tx-Rx isolation, Tx-antenna isolation, and antenna-Rx isolation.

In an example configuration 50 shown in FIG. 3, a duplexer filter 56 can perform a number of constrained functions in order to enable a radio link to operate. For example, the duplexer filter 56 can enable Tx (52) and Rx (58) branches (which are operating simultaneously in an FDD configuration in different frequency bands, one for the transmit (Tx) and a separate one for the receive (Rx)) to both connect to a single antenna node, which can then be selected through an antenna switch to a single antenna 60.

On the signal combining aside, an in-line insertion loss can be an important factor on both the Tx and Rx sides of the radio. On the Tx side, post-PA losses typically requires that a power amplifier (PA) 54 produce more output power, which can drastically increase the DC current consumption of the most dissipative block in the system at maximum or increased power. On the Rx side, in-line insertion loss can have a significant impact in increasing the noise floor and decreasing the Rx's ability to successfully de-modulate signals at relatively low power levels near that noise floor of the Rx sensitivity.

In addition, the Tx carrier power, if it manages to leak over to the Rx input, can interact with the nonlinearities of the Rx chain to further increase the noise floor. The Tx path can also produce noise power in band of the Rx, and if it leaks over to the Rx input, it can also increase the overall noise floor. Both the carrier Tx power at the Tx frequencies, and the Tx noise produced directly or approximately at the Rx frequencies can serve to significantly "de-sense" the Rx. Thus, it is desirable for the duplexer to protect the Rx from the in-band Tx noise, as well as the out-of-band Tx carrier power, preferably with the least or reduced in-line insertion loss from antenna to Rx, in order to maintain optimum Rx performance.

Figure 4:
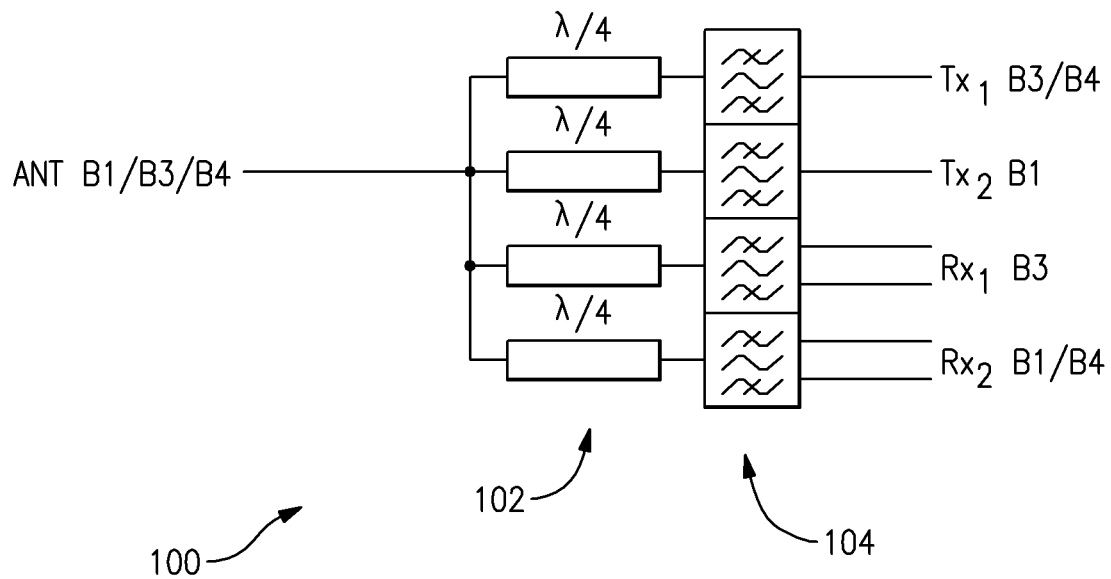
FIG. 4 shows an example multiband filtering configuration.

The combination of the Tx and Rx filters is typically restricted to combining the Tx and Rx partner bands of a given FDD band definition; but for the definitions of some of the bands, either a Tx or Rx bandwidth can be partially shared. For example, as shown in FIG. 4, 3GPP band 3 and band 4 Tx, and 3GPP band 1 and band 4 Rx overlap partially. In some implementations, a combination of bands can be configured to combine substantially full functionalities of bands 1, 3, and 4 in a quadplexer as shown in FIG. 4. Such a combination can enable less filter content and package size for the total sum of the paths.

The foregoing example constraints of the duplexer can be further illustrated with a specific example (110) of the 3GPP standard's Band 2 in FIG. 5A. The example includes a depiction 112 of a transmit bandwidth (60 MHz), in-line insertion loss, and out-of-band attenuation of the RxBand noise, as well as a receive bandwidth (60 MHz), in-line insertion loss, and out-of-band attenuation of the Tx carrier power. Of particular note is the very small gap between the Tx and Rx passbands (20 MHz), and this constrains significantly the amount of out-of-band attenuation that can be achieved with such a short % relative bandwidth away in frequency away from the passband.

The insertion loss typically increases as a result of this requirement to attenuate so strongly very close to the passband. Another factor that can force the duplexer design to have a higher insertion loss than it might otherwise achieve is the overall passband bandwidth. When the passband bandwidth is a larger percentage of the RF frequency, the insertion loss can increase as it becomes more difficult to extend a flat passband response across a wider bandwidth. A reason can include a number of series resonators required. In general, a smaller bandwidth typically requires a fewer number of series resonators, thereby resulting in a lower insertion loss.

An effect of reducing the passband bandwidth is demonstrated in FIG. 6A, with a standard filter bandwidth ($BW_1$) and resulting insertion loss ($IL_{MID1}$), which is often dominated by the requirement for a flat passband characteristic across a fairly wide bandwidth. In addition, the insertion loss at the band edge ($IL_{EDGE1}$) is often dominated by the band edge roll-off in order to reach required attenuation levels a short frequency away from the passband. The overall performance of the filter is often evaluated based on the worst insertion loss, which is typically highest at the band edge.

As the filter bandwidth constraint is relaxed for the same filter (see FIG. 6B), the effect of roll-off at the band edges can be eliminated or reduced, and a flatter portion of lower loss in the band center can be achieved ($IL_{MID2}$). A reason why this is not done in current front-ends can include a fact that there and may actually save die area for the SAW (surface acoustic wave) technology as well. In some implementations, if the bandwidth is decreased appropriately, then the passband center loss ($IL_{MID3}$) can be made much smaller, and substantially equal to the band edge loss ($IL_{EDGE3}$).

The foregoing example factors shown and described in reference to FIG. 6 demonstrate that segmenting of a passband into smaller bandwidths can result in less insertion loss. Aside from such an advantage, there can also be another advantage of the segmenting, as shown in FIG. 5B. The actual separation between the Tx carrier and Rx frequency is typically fixed at the duplexer spacing (e.g., 80 MHz), but the filter's out-of-band attenuation can be forced to be very close to the band edge in configurations involving relatively large fixed bandwidths of the filters and a relatively small filter gap between the two passbands. The steepness of the attenuating skirt can be constrained by that much smaller duplexer gap, instead of the larger duplexer frequency spacing between Tx and Rx which is typically held constant at a much larger number.

If one considers the attenuation to be at the duplexer spacing, the attenuation skirt steepness can be significantly relaxed and thereby achieve a desired isolation out-of-band, but at less penalty to the insertion loss. FIG. 5B shows a segmented portion of the example 3GPP band 2 (120) implemented in a duplexer design 122 in contrast to the example of FIG. 5A, which covers substantially the entire band 2. By reducing the pass band for the fixed duplexer spacing, the duplexer gap between Tx and Rx filter edges now increases significantly (from 20 MHz to 40 MHz in the example shown), and this can significantly reduce filter insertion losses, as well as greatly improve out-of-band attenuation.

A current product example of this trade-off is seen with two SAW-based duplexers designed by the same manufacturer for 3GPP band 3 and 3GPP band 4. Table 1 demonstrates an effect of duplexer gap and passband bandwidth on duplex filter insertion losses. The example values listed in Table 1 are approximate values.

TABLE 1

| Band | Tx Freq (MHz) | Rx Freq (MHz) | Duplex gap (MHz) | Passband BW (MHz) | Tx IL dB (typ) | Tx IL dB (max) | Rx IL dB (typ) | Rx IL dB (max) |
|---|---|---|---|---|---|---|---|---|
| B3 | 1710-1785 | 1805-1880 | 20 | 75 | 2.2 | 3.6 | 3.4 | 4.0 |
| B4 | 1710-1755 | 2110-2155 | 355 | 45 | 1.3 | 2.1 | 2.0 | 2.6 | is not enough room between the band edge and the large attenuation required by the small duplexer gap. This roll-off can often contribute to or dominate the worst case performance of the filter upon which the insertion loss selection criteria is typically based, as it can affect the worst channel at band edge.

In some situations, temperature variation and sensitivity to temperature extremes can serve to further cause frequency shifts in the filter pole and zero frequencies, and the passband can move around in frequency as a result. The attenuation and in line insertion loss at the band edges can then suffer significant degradation. In some implementations, a filter design disclosed herein can address such a problem by maintaining less requirement to roll-off so close to the pass band, and the insertion loss can be significantly improved.

A further step in improving insertion loss (FIG. 6C) can be implemented by designing a different version of the filter that addresses a smaller passband bandwidth. In some implementations, this can further relax the number of series resonators It can be easily seen that the smaller duplex gap between Tx and Rx yields a steeper attenuation skirt and roll-off at band edge, and these can result in worst case or undesirable maximum insertion loss values, especially when filter roll-off moves the steep band edge with regard to process and temperature. The typical insertion loss number can also driven by the performance at band edge, along with the passband bandwidth. What is seen for the B3 and B4 Tx examples is that the shorter duplex gap and larger passband drive up the typical insertion loss of the Tx filter by approximately 0.9 dB, and the worst case insertion loss degrades by approximately 1.5 dB. On the Rx side where the out-of-band attenuation constraints are even tighter, the degradation in typical insertion loss is approximately 1.4 dB, and the worst case max degradation is approximately 1.4 dB. As described herein, the present disclosure includes filter designs where one or more of these driving constraints are relaxed, to thereby improve either or both of the filter insertion loss and out-of-band attenuation.

Figure 7A:
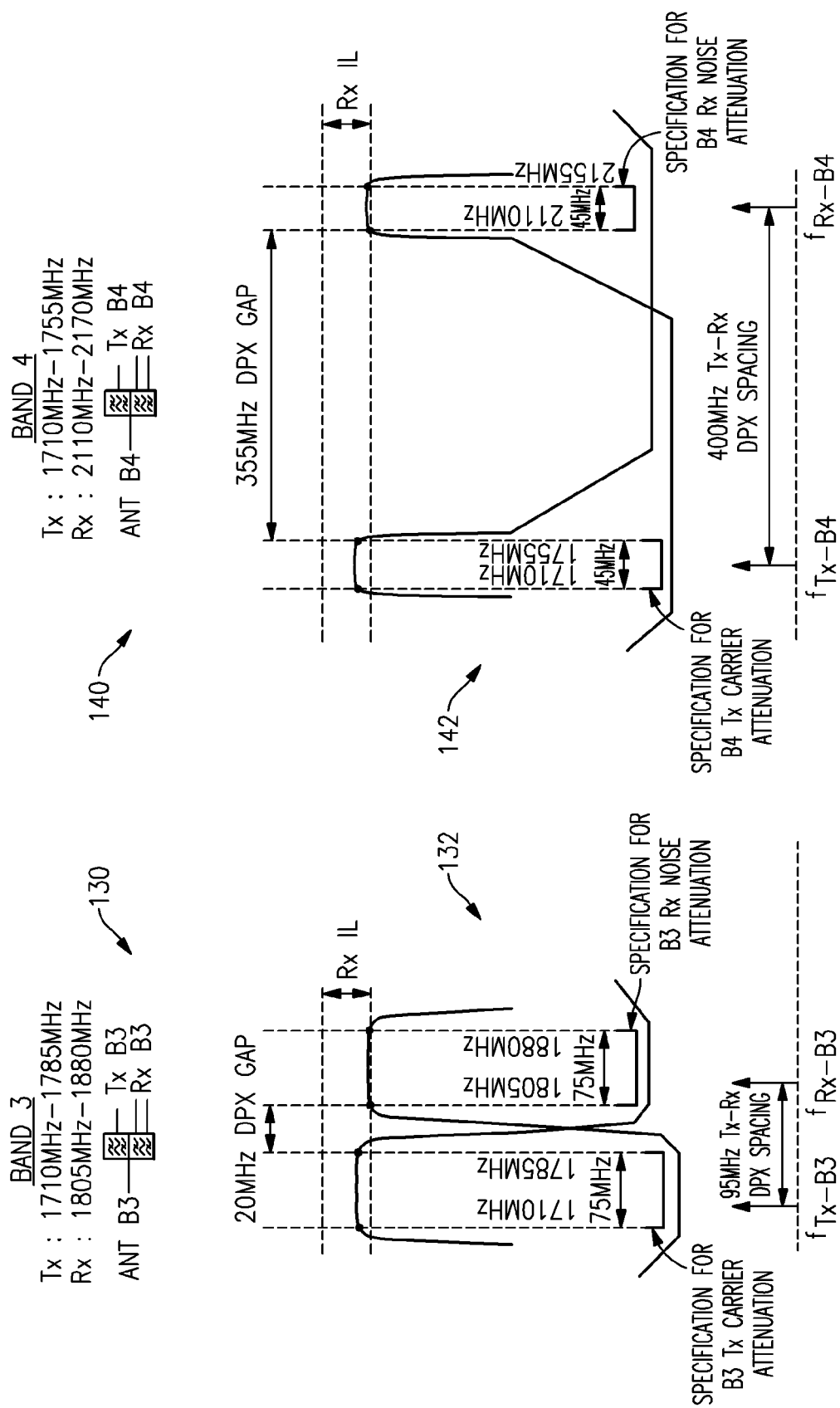
FIG. 7A shows Tx and Rx portions of 3GPP bands 3 and 4.
Figure 7B:
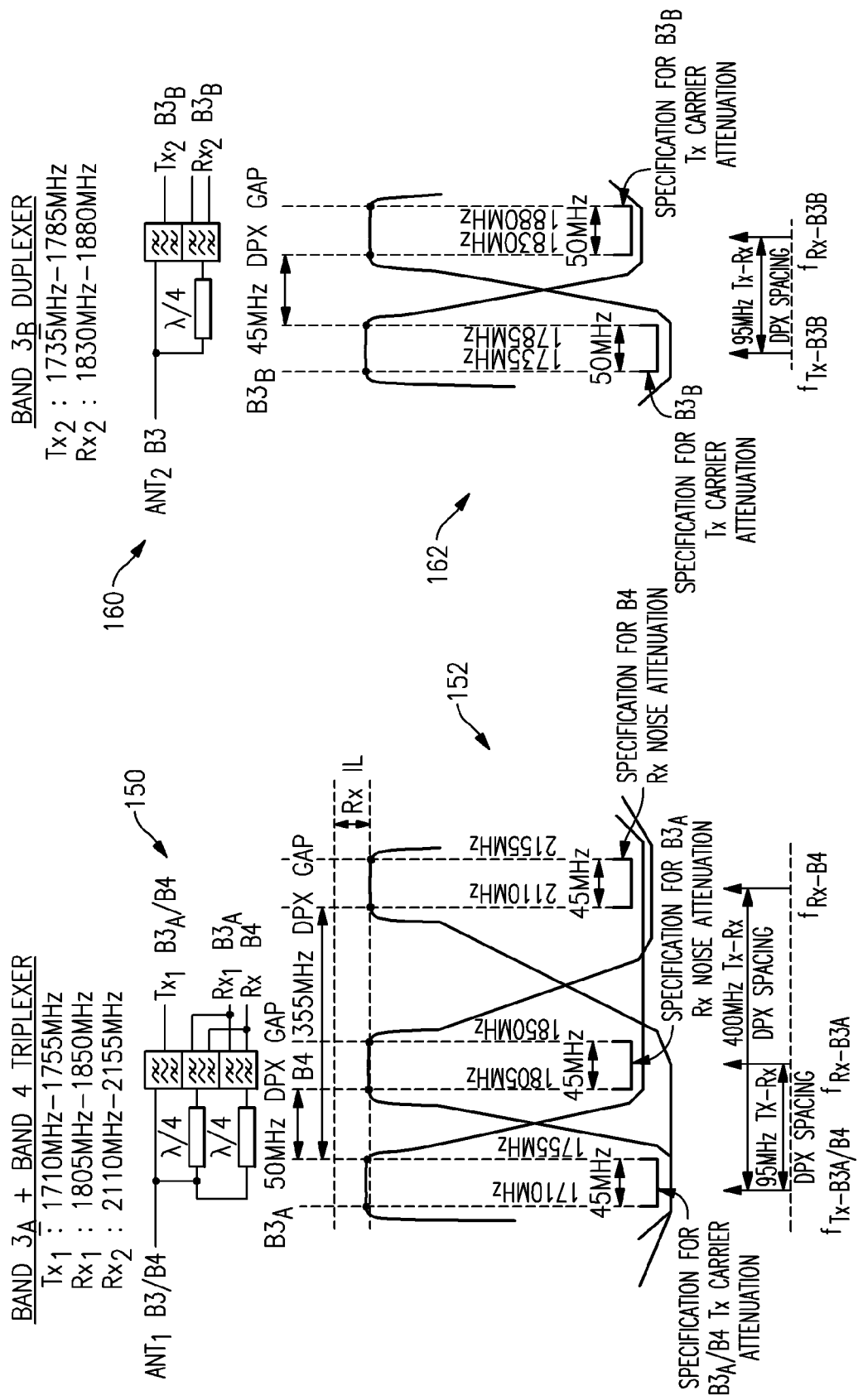
FIG. 7B shows that the Tx-to-Rx duplex spacing can be extended to relax a steep skirt requirement for attenuation out-of-band.

FIG. 7A depicts the foregoing examples representative of the 3GPP bands 3 and 4. As seen in configuration 130, 132 of FIG. 7A, the original duplexer gap is only 20 MHz and standard filters would be required for complete attenuation by both the Tx and Rx out-of-band to satisfy that 20 MHz spacing. In an example implementation 160, 162 shown in FIG. 7B, the Tx-to-Rx duplex spacing can be extended from 20 MHz to 45 MHz worst case, thereby significantly relaxing the steep skirt requirement for attenuation out-of-band.

One challenge associated with the foregoing design can be that the channel raster (the grid upon which the channel center frequency may be positioned) is 100 kHz and if a channel is required to be placed directly between the two filter segments, then this approach may not be able to transmit, and would likely fail conformance requirements tests. In order to overcome this limitation, a solution can be provided where the bandwidths of the two segments dedicated to any one given band overlap by at least the amount of the maximum channel bandwidth. There will exist; therefore, at least one worst case channel with the maximum channel bandwidth which can be received by either filter, and no channel frequencies that cannot be entirely or substantially passed with substantially complete channel bandwidth through one or the other of the two filters.

Another challenge with this partitioning can be that despite the improved performance, the filter content (e.g., cost and size) and number of distinct Rx paths to interface to can increase. In order to mitigate this, careful arrangement and consolidation of the paths can be implemented for optimum or desired partitioning.

Figure 8:
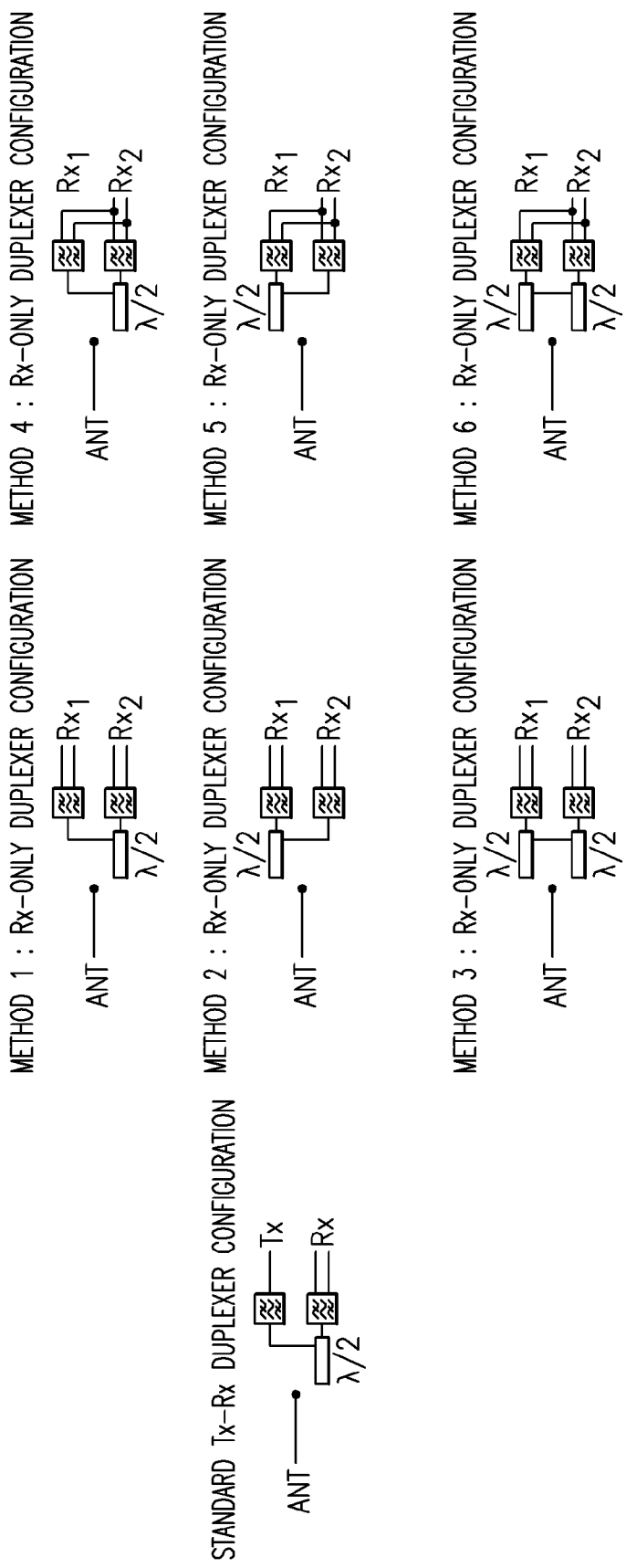
FIG. 8 shows various examples of Rx-only duplexing configurations that can utilize one or more quarter-wave isolating phase shift elements.

In some embodiments, an arrangement of Rx-only duplexing can contain a quarter-wave isolating phase shift element (or equivalent) on either side of the filter, or on both as shown in FIG. 8. In some embodiments, as additionally shown in FIG. 6, separate segments of the Rx bands may be consolidated as shown, with a constraint that the bands not overlap themselves, and the corresponding Tx frequencies for those Rx bands to be consolidated not overlap either of the Rx bands.

One performance trade-off to consider when consolidating/combining the Rx outputs can be that, depending on the band and isolation between the two Rx bands, there can be additional loss incurred vs. that of a stand-alone filter. This a trade-off consideration can be managed as part of a design or optimization process.

Another loss that may be incurred depending on the method of consolidation is that high-Q matching networks are typically implemented at the Rx input of the transceiver. Thus, if the two consolidated Rx bands are quite different in frequency, there may be mismatch loss suffered as a result.

Additional loss may be incurred when the filters are duplexed, as opposed to a stand-alone Rx filter; but as long as the duplexer spacing and/or passband bandwidth are relaxed, the performance of the duplexer can approach that of a standard in line stand alone filter. In some implementations, it is important that these loss mechanisms are managed and kept much smaller than the benefit of the approach described herein.

Figure 9A:
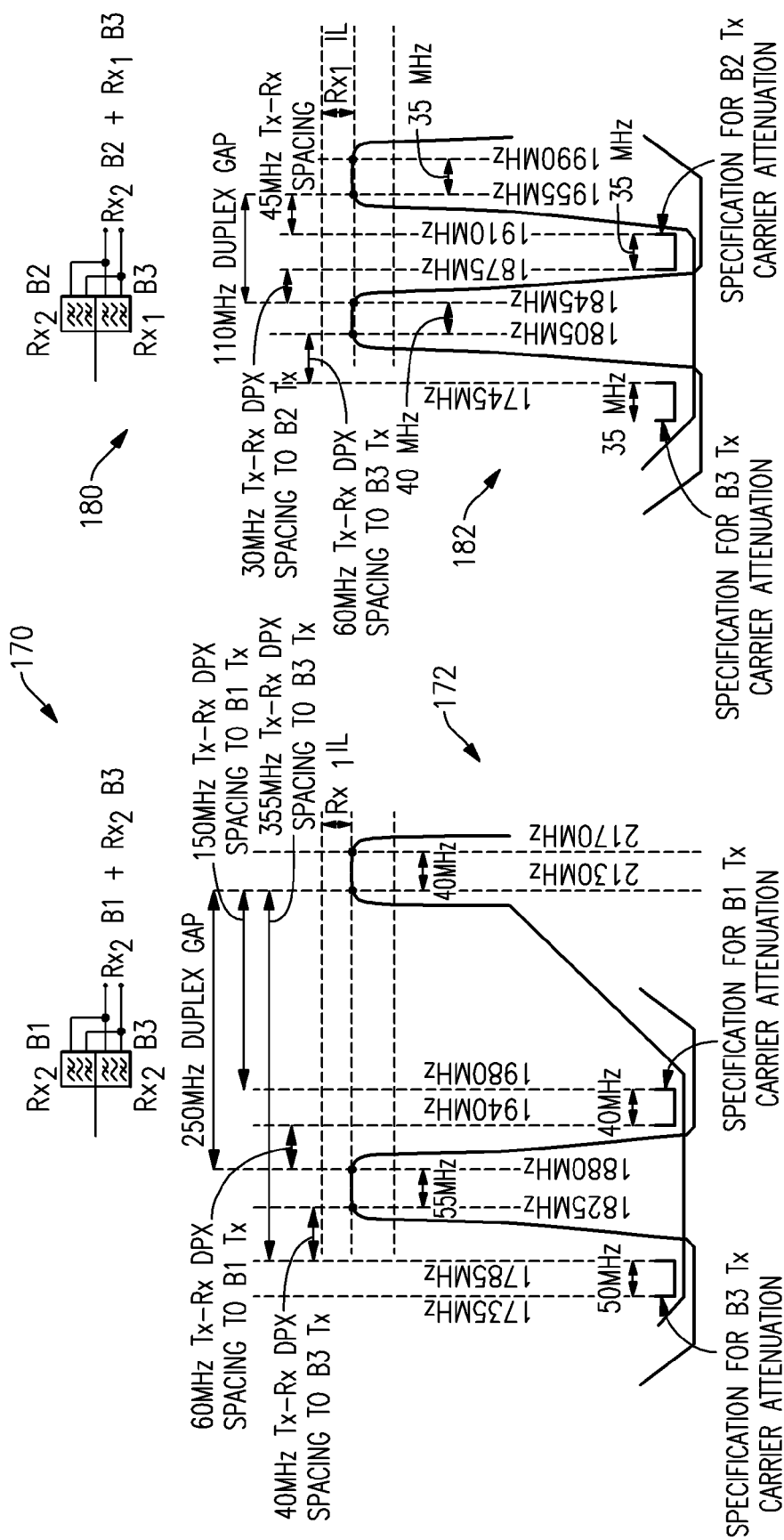
FIG. 9A shows examples of partitioning of various Rx bands.
Figure 9B:
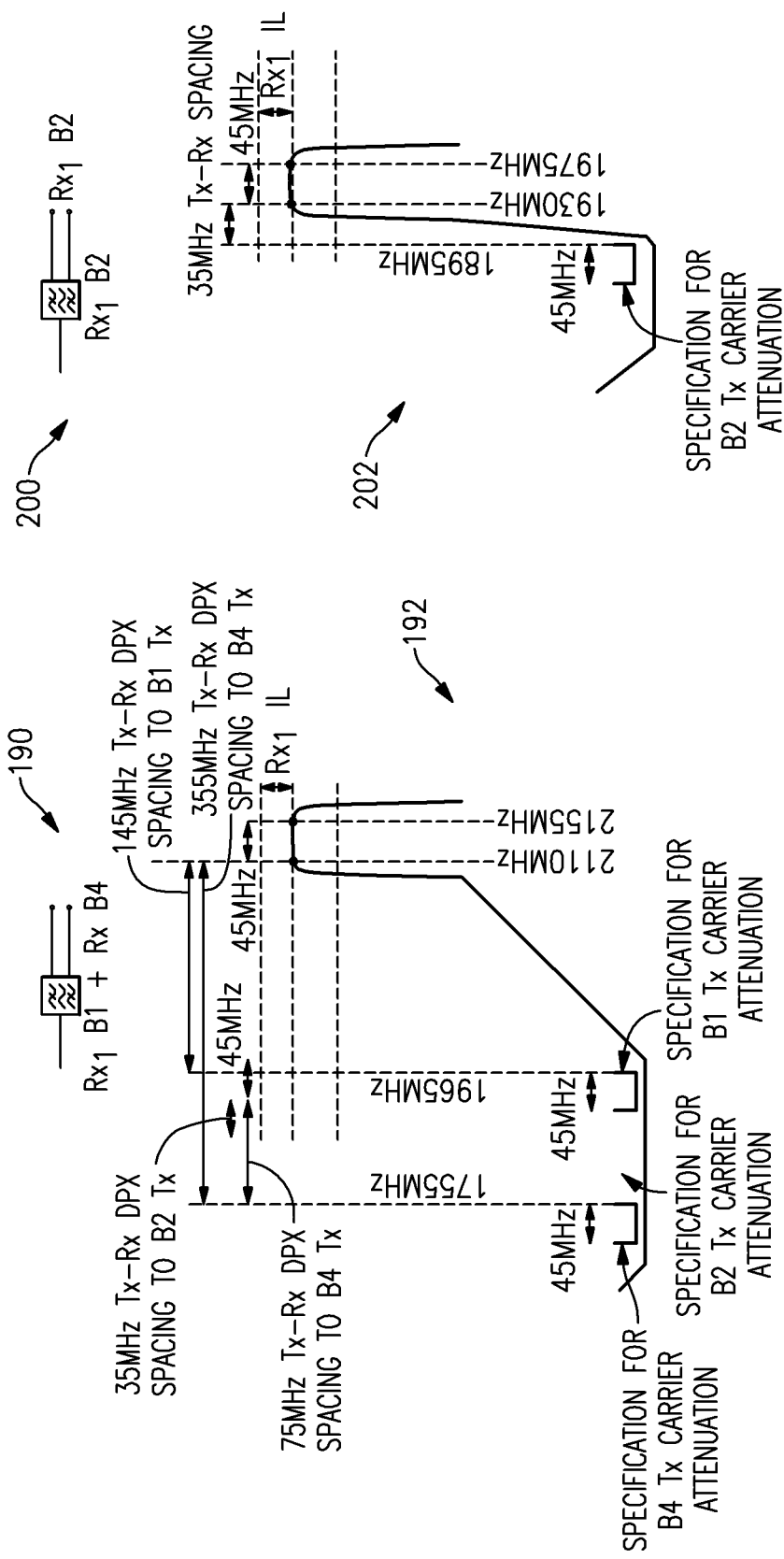
FIG. 9B shows additional examples of partitioning of various Rx bands.

A specific example of how to partition the frequency bands so that they can benefit as disclosed herein, is described in the context of the following 3GPP bands (listed in Table 2) in reference to FIGS. 9A and 9B.

TABLE 2

| Band | Tx | Rx |
| --- | --- | --- |
| Band 1 | 1920 MHz-1980 MHz | 2110 MHz-2170 MHz |
| Band 2 | 1850 MHz-1910 MHz | 1930 MHz-1990 MHz |

TABLE 2-continued

| Band | Tx | Rx |
| --- | --- | --- |
| Band 3 | 1710 MHz-1785 MHz | 1805 MHz-1880 MHz |
| Band 4 | 1710 MHz-1755 MHz | 2110 MHz-2155 MHz |

Taking into account that two segmented portions of each total assigned band contain enough overlap to enable passage of a maximum channel bandwidth (e.g., 20 MHz in LTE) through one or the other filter for all channel center frequencies, the assigned filter passbands for the B1, B2, B3, and B4 filters are shown. The smaller bandwidths of each separate filter vs. the standard band coverage, and/or relaxed out-of-band requirements can enable significantly lower in-line Ant-Rx insertion loss for these paths. Additional constraints taken into account for the consolidation of the Rx bands and determining how to pair (or group) them up for duplexing (or multiplexing) can include the locations of the associated Tx frequencies and the overlap bands themselves.

The example details of the partitioning and segmentation for FIG. 9A shows that; although the standard duplex gap between the Rx and Tx filters in B2 is 20 MHz, with the example partitioning of FIG. 9A, this can be extended to 35 MHz (configuration 182), while the passband bandwidth can be reduced from 60 MHz down to 45 MHz. Similarly for B3, the standard duplex gap is only 20 MHz, and the example partitioning can relax it to a worst case of 30 MHz, and the passband can be reduced from 75 MHz to worst case 55 MHz. These are examples of significant impacts to the B2 and B3 insertion loss and out-of-band performance.

Similarly, FIG. 9B shows examples of partitioning of bands 1,2, and 4 such that the Rx bands are broken up and covered in pieces. In some embodiments, frequency segments can be consolidated optimally, giving consideration of the overlap bands, and possible location of simultaneous Tx carrier frequencies in order to assure or improve isolation from Tx carrier desense nonlinear effects.

Figure 10:
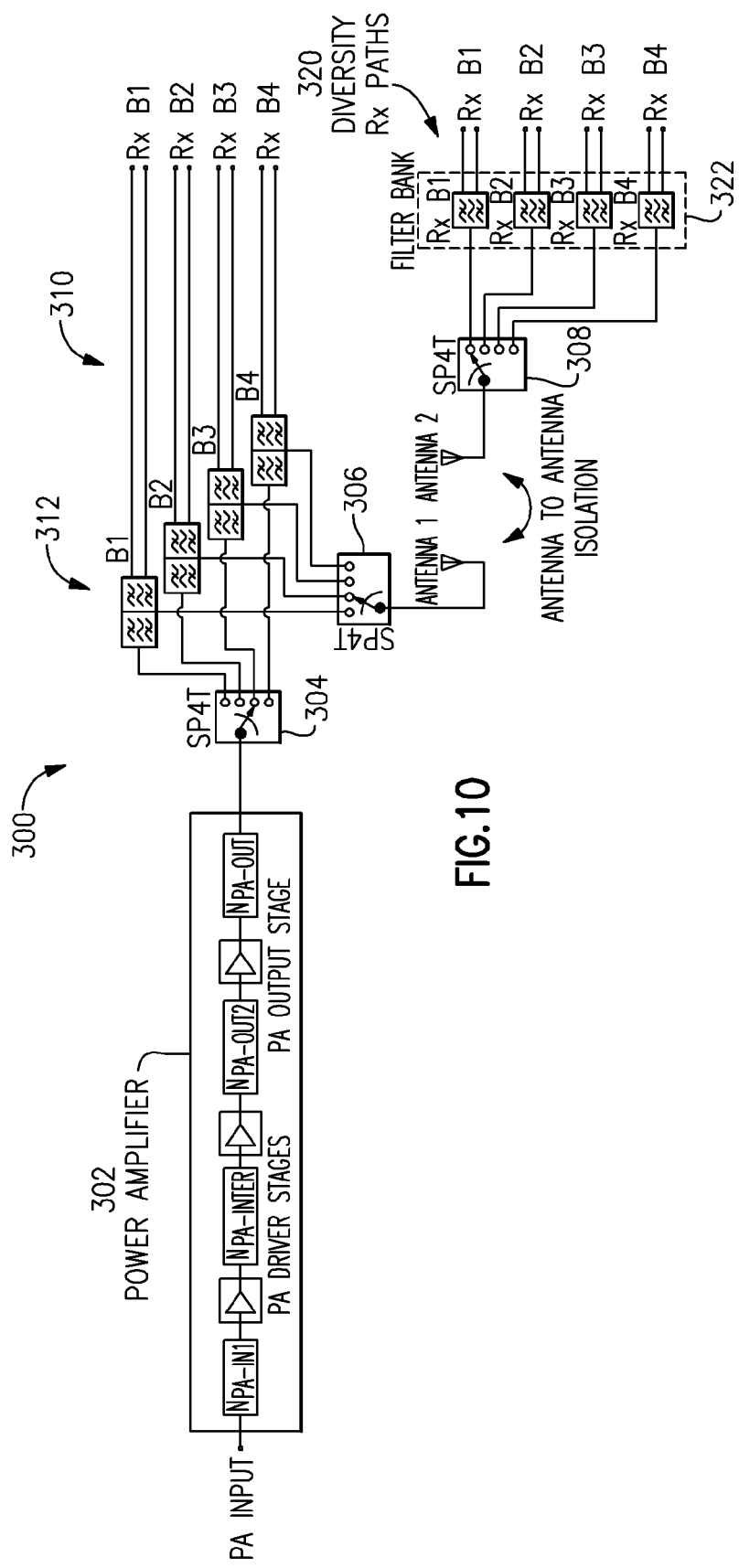
FIG. 10 shows an example front-end configuration having a plurality of single duplexers that can facilitate implementation of multiple Rx paths from an antenna.

An example front-end configuration 300 for 3GPP bands 1, 2, 3 and 4 is shown in FIG. 10, where single duplexers 312 following a PA 302 are used for a main antenna (Antenna 1). Such duplexers are shown to be connected to their respective Rx paths 310. Selection of an operating band among the duplexers 312 can be achieved by switches 304, 306.

Also shown is a second antenna (Antenna 2) that can be implemented for the application of diversity to a second antenna and received signal that can significantly increase signal-to-noise ratio (SNR) for that received signal. As a further extension of the foregoing application of that second antenna, the emerging standard of LTE (Long Term Evolution—4G) has a requirement for this second antenna that is to be used for Downlink Multiple-Input-Multiple-Out (DL MIMO) so that the two antennas are in fact receiving two different receive signals at the same time. This diversity antenna, and the associated front-end can be seen in FIG. 10 to only contain receive circuits, and there is no Tx diversity or UL MIMO planned in the standards at the present time, primarily due to current consumption limits on the handset. These receive-only circuits can include, for example, Rx SAW filters 322 and direct connection to the Rx paths 320 of the transceiver. In some implementations, and similar to Rx SAW filters associated with TDD applications, this diversity path can benefit from one or more features of the present disclosure.

Figure 11:
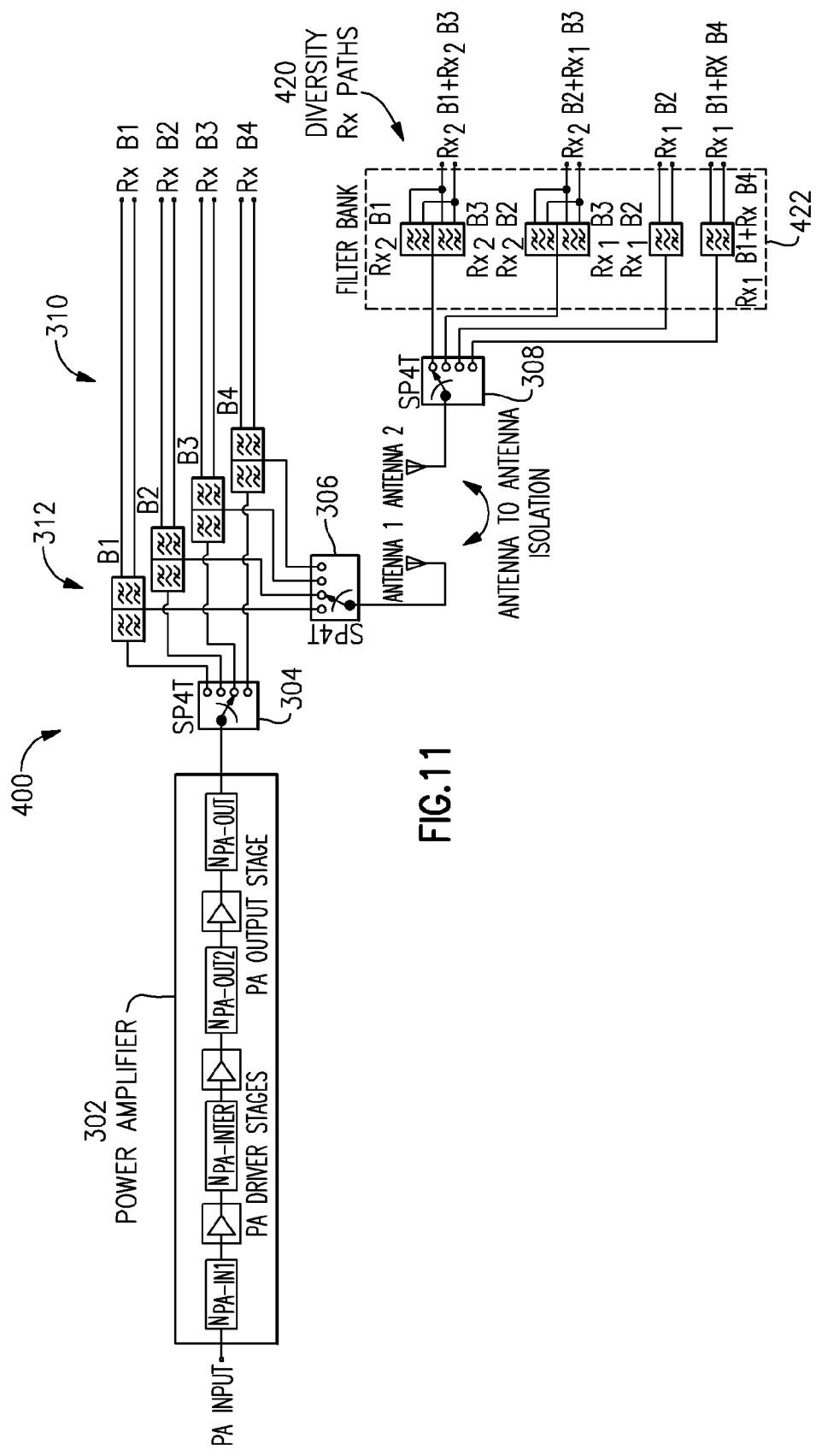
FIG. 11 shows an example front-end configuration having Rx-only filters duplexed in pairs and consolidated in a filter bank along diversity Rx paths.

In a similar manner, one or more features associated with the filter segmentation described herein can be implemented for an Rx-only duplex filter design, and an example 400 of such a design is shown in FIG. 11 in the context of the example 3GPP bands 1, 2, 3, and 4. These Rx-only filters are shown duplexed in specific pairs and consolidated in a filter bank 422 along diversity Rx paths 420 so as to optimize or improve insertion loss and/or out-of-band attenuation performance.

Figure 12:
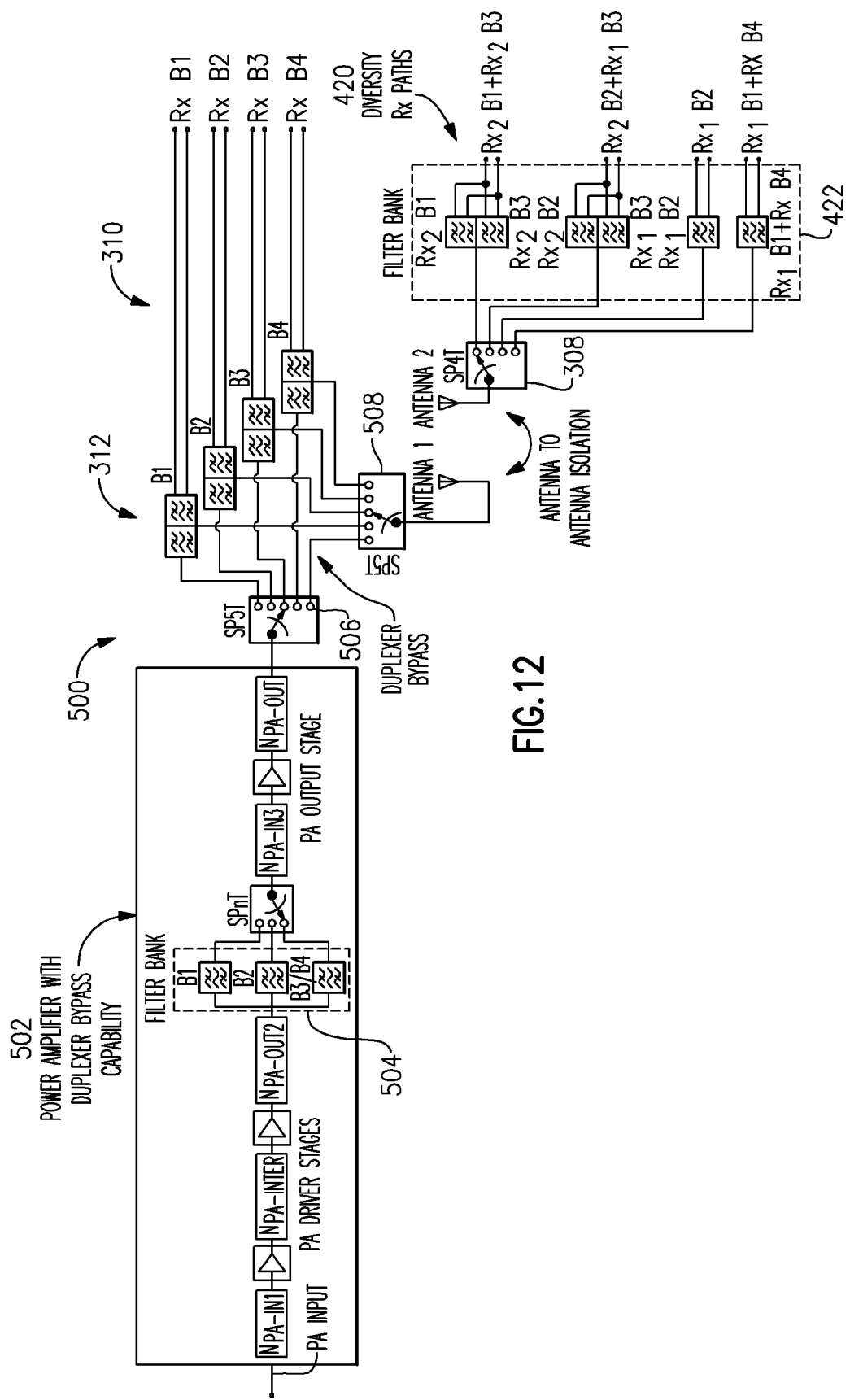
FIG. 12 shows an example front-end configuration having a filter bank along an amplification stages of a power amplifier to provide duplexer bypass capability.

Another example of a system that requires additional Tx carrier leakage in Rx-only filter paths can include an architecture 500 shown in FIG. 12. The example architecture is shown to include a filter bank 504 along an amplification stages of a PA 502 to provide duplexer bypass capability. The example shows that in some embodiments, one or more features of partitioning described herein can be implemented to allow the Tx and Rx to operate on dedicated antennas, and for the Tx to leverage the benefits of the duplexer bypass path so that it might not be required to suffer the loss of a post-PA duplexer. In some implementations, additional constraints on the noise transmitted out the Tx antenna can be considered and/or imposed. By association of the isolation between the two antennas (which may or may not be well controlled), the Rx filter can be configured to perform appropriately to substantially avoid nonlinear mechanisms from further interacting with the desired channel and noise present. Additional requirements can be considered and/or imposed on Tx carrier attenuation that may not be present with a typical Rx filter. By implementing the Rx-only duplexer, the in-line insertion loss can further enhance the noise floor, and the Tx attenuation can assist in reducing nonlinear mechanism degradation within the Rx as well.

As described herein, various circuits and methods can significantly improve the insertion loss and out-of-band attenuation of Rx filtering in multi-band front-ends.

Figure 13:
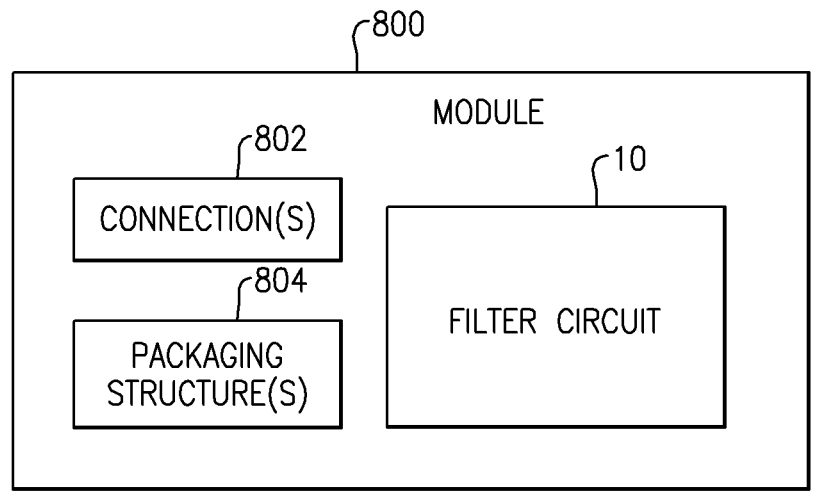
FIG. 13 schematically shows that a filter circuit having one or more features of the present disclosure can be implemented in one or more modules.

FIG. 13 shows that in some embodiments, a filter circuit 10 having one or more features described herein can be part of a packaged module 800. The module 800 can also include a packaging substrate, such as a laminate substrate, configured to receive a plurality of components. The module 800 can also include one or more connections to facilitate providing of signals to and from the filter circuit 10. The module 800 can also include various packaging structures 804. For example, an overmold structure can be formed over the filter circuit 10 to provide protection from external elements.

In some embodiments, the filter circuit 10 that is part of the module 800 can be implemented on one or more semiconductor dies. In some embodiments, the module 800 can include a front end module configured for use in RF devices such as wireless devices.

Figure 14:
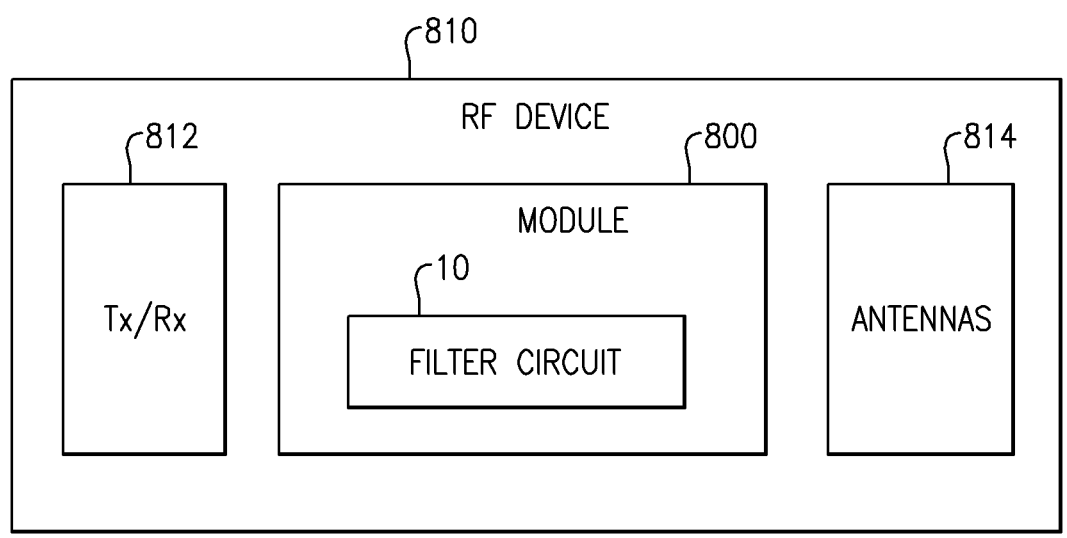
FIG. 14 schematically shows that filter circuit having one or more features of the present disclosure can be implemented in an RF device.

FIG. 14 shows that in some embodiments, a module 800 having a filter circuit 10 can be included in an RF device 810 such as a wireless device. Such a wireless device can include, for example, cellular phone, a smart phone, etc. In some embodiments, the filter circuit 10 can be implemented in a packaged module such as the example of FIG. 13. The RF device 810 is depicted as including other common components such a transceiver circuit 812. In some embodiments, the RF device 810 can include one or more antennas 814 to facilitate the various filtering functionality described herein.

In some implementations, an architecture, a device and/or a circuit having one or more features described herein can be included in an RF device such as a wireless device. Such an architecture, a device and/or a circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless access point, a wireless base station, etc.

Figure 15:
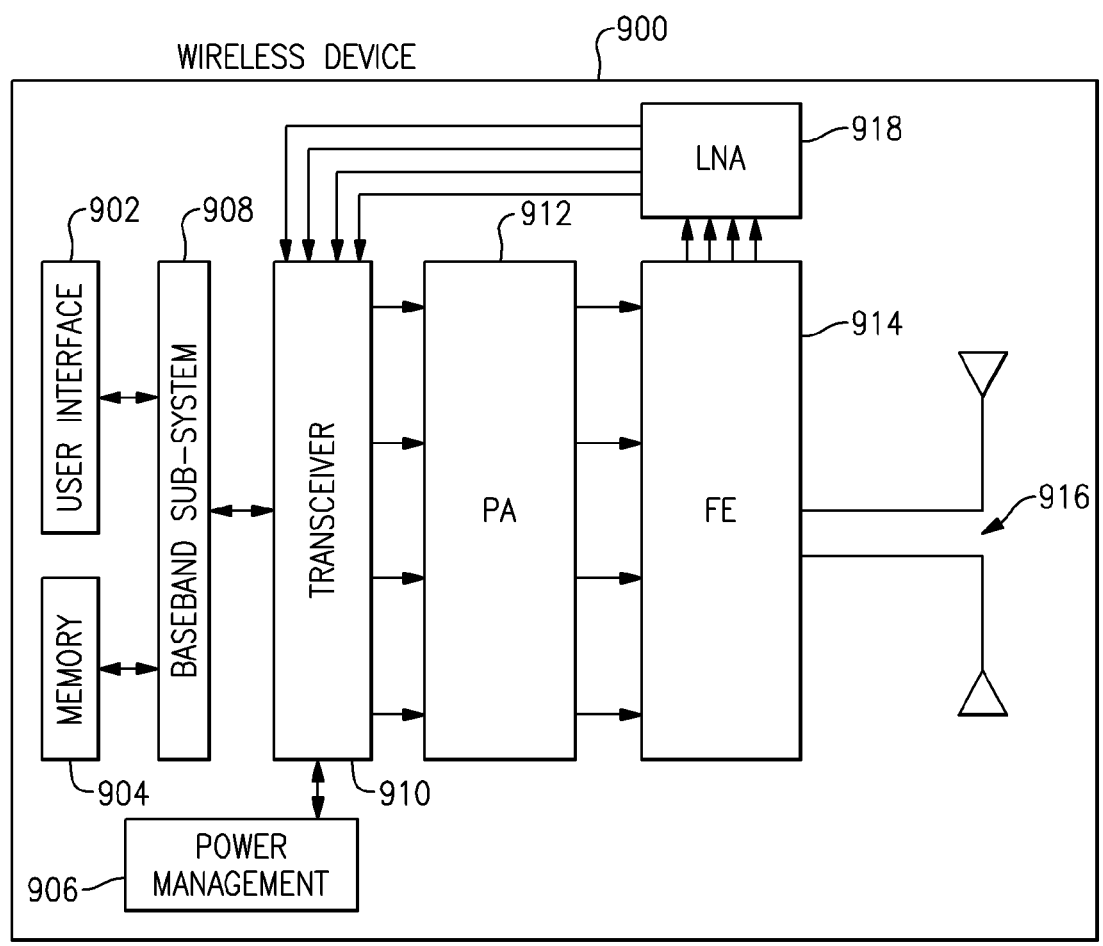
FIG. 15 schematically shows an example wireless device having one or more features of the present disclosure.

FIG. 15 schematically depicts an example wireless device 900 having one or more advantageous features described herein. In some embodiments, such advantageous features can be implemented in a front-end (FE) module 914.

PAs in a PA module 912 can receive their respective RF signals from a transceiver 910 that can be configured and operated in known manners to generate RF signals to be amplified and transmitted, and to process received signals. The transceiver 910 is shown to interact with a baseband sub-system 908 that is configured to provide conversion between data and/or voice signals suitable for a user and RF signals suitable for the transceiver 910. The transceiver 910 is also shown to be connected to a power management component 906 that is configured to manage power for the operation of the wireless device 900. Such power management can also control operations of the baseband sub-system 908 and other components of the wireless device 900.

The baseband sub-system 908 is shown to be connected to a user interface 902 to facilitate various input and output of voice and/or data provided to and received from the user. The baseband sub-system 908 can also be connected to a memory 904 that is configured to store data and/or instructions to facilitate the operation of the wireless device, and/or to provide storage of information for the user.

In the example wireless device 900, outputs of the PAs of the PA module 912 are shown to be provided to the FE module 914. In some embodiments, functionalities such as band-selection and filtering of Rx signals as described herein can be implemented in the FE module 914. In FIG. 15, received signals are shown to be routed from the FE module to one or more low-noise amplifiers (LNAs) 918. Amplified signals from the LNAs 918 are shown to be routed to the transceiver 910.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system for processing radio-frequency (RF) signals, the system comprising:
a plurality of signal paths configured to accommodate multiple frequency bands including bands B1, B2, B3 and B4 associated with a 3GPP communication standard, each of the multiple frequency bands having a passband; and
a plurality of filter circuits, a corresponding filter circuit of the plurality of filter circuits disposed along each of the signal paths, at least one segmented filter circuit of the plurality of filter circuits segmented into two or more segments configured to provide attenuation of out-of-band interferers, the plurality of filter circuits arranged to partition at least one receive band of the multiple frequency bands into two overlapping frequency segments received on different ones of the signal paths, the plurality of filter circuits arranged to partition bands B1, B2, B3 and B4 such that receive (Rx) bands of bands B1, B2, and B3 each include two overlapping frequency segments received on different ones of the signal paths.

2. The system of claim 1 wherein the signal paths include receive (Rx) paths.

3. The system of claim 2 wherein the Rx paths include Rx-only paths.

4. The system of claim 3 wherein the at least one segmented filter circuit includes a first segmented filter circuit and a second segmented filter circuit arranged in a receive-only duplexer configuration to provide out-of-band attenuation.

5. The system of claim 4 wherein the first and second segmented filter circuits are configured to provide frequency coverage for substantially entirety of a passband corresponding to the at least one segmented filter circuit.

6. The system of claim 5 wherein the first and second segmented filter circuits are further configured so that a maximum channel bandwidth associated with the passband corresponding to the at least one segmented filter circuit is within separate passbands associated with the first and second segmented filter circuits.

7. The system of claim 4 wherein the receive-only duplexer configuration includes a diversity receive circuit of a front end system.

8. The system of claim 7 wherein the diversity receive circuit is configured to operate with a transmit (Tx) carrier suppression property.

9. The system of claim 4 wherein the segments of the at least one segmented filter circuit share a common Rx port and a duplex shared port.

10. The system of claim 4 further comprising a switch configured to allow selection of a band.

11. The system of claim 4 further comprising a duplexer configured to duplex outputs of the first and second segmented filter circuits and provide further frequency dependent selective combining to yield a common output.

12. The system of claim 1 wherein transmit and receive passbands associated with the bands B1, B3 and B4 are consolidated with four passbands.

13. The system of claim 1 wherein the frequency segments are consolidated based on overlap bands and possible location of simultaneous Tx carrier frequencies.

14. The system of claim 1 wherein the signal paths include at least one transmit (Tx) path.

15. A radio-frequency (RF) module comprising:
a packaging substrate configured to receive a plurality of components and including a plurality of signal paths configured to accommodate multiple frequency bands including bands B1, B2, B3 and B4 associated with a 3GPP communication standard;
a filter system disposed on the packaging substrate and having a plurality of filter circuits configured to accommodate the multiple frequency bands, at least one segmented filter circuit of the plurality of filter circuits segmented into two or more segments configured to provide attenuation of out-of-band interferers, the plurality of filter circuits arranged to partition at least one receive band of the multiple frequency bands into two overlapping frequency segments received on different ones of the signal paths, the plurality of filter circuits arranged to partition bands B1, B2, B3 and B4 such that Rx bands of bands B1, B2, and B3 each include two overlapping frequency segments received on different ones of the signal paths; and
a plurality of connectors configured to provide electrical connections between the filter system and the packaging substrate.

16. The RF module of claim 15 wherein transmit and receive passbands associated with the bands B1, B3 and B4 are consolidated with four passbands.

17. The RF module of claim 15 wherein the signal paths include at least one Tx path.

18. A radio-frequency (RF) device comprising:
a transceiver configured to process RF signals in multiple frequency bands including bands B1, B2, B3 and B4 associated with a 3GPP communication standard;
one or more antennas in communication with the transceiver to facilitate transmission and reception of the RF signals via a plurality of signal paths configured to accommodate the multiple frequency bands; and
a filter system connectable to the transceiver and the one or more antennas, the filter system having a plurality of filter circuits configured to accommodate the multiple frequency bands, at least one segmented filter circuit of the plurality of filter circuits segmented into two or more segments configured to provide attenuation of out-of-band interferers, the plurality of filter circuits arranged to partition at least one receive band of the multiple frequency bands into two overlapping frequency segments received on different ones of the signal paths, the plurality of filter circuits arranged to partition bands B1, B2, B3 and B4 such that Rx bands of bands B1, B2, and B3 each include two overlapping frequency segments received on different ones of the signal paths.

19. The RF device of claim 18 wherein transmit and receive passbands associated with the bands B1, B3 and B4 are consolidated with four passbands.

* * * * *